United States Patent [19]
Okuda et al.

[11] Patent Number: 5,894,370
[45] Date of Patent: Apr. 13, 1999

[54] INCLINATION MONITORING SYSTEM

[75] Inventors: Isao Okuda; Toshiyuki Kase; Hiroshi Nishikawa, all of Tokyo, Japan

[73] Assignee: Asahi Kogaku Kogyo Kabushiki Kaisha, Tokyo, Japan

[21] Appl. No.: 08/899,817

[22] Filed: Jul. 24, 1997

[30] Foreign Application Priority Data

Jul. 26, 1996 [JP] Japan ................... 8-197314

[51] Int. Cl.$^6$ ................................. G02B 7/02
[52] U.S. Cl. ............... 359/822; 359/618; 356/138; 356/139.05; 356/363; 356/359; 250/201.5
[58] Field of Search ................. 359/618, 822; 356/138, 139.04, 139.05, 359, 360, 363; 250/201.5; 369/112

[56] References Cited

U.S. PATENT DOCUMENTS 4,537,473  8/1985  Maschmeyer ................ 356/359
5,553,052  9/1996  Oono et al. .................. 369/112
5,742,383  4/1998  Jeon ............................ 356/138

*Primary Examiner*—Loha Ben
*Attorney, Agent, or Firm*—Greenblum & Bernstein, P.L.C.

[57] ABSTRACT

An inclination status monitoring system which optically detects an inclination of a lens as it changes its inclination. A light beam having a diameter greater than the diameter of the lens to be inclined is incident on the lens. The lens has a planar reflective surface surrounding a lens portion thereof. The light beam is reflected on the reflective surface, and the reflected beam is converged by a converging lens and focused on an image receiving system, which enables a user to observe the image formed on an image receiving surface. The image of the reflected beam moves simultaneously as the lens inclination is changed.

12 Claims, 9 Drawing Sheets

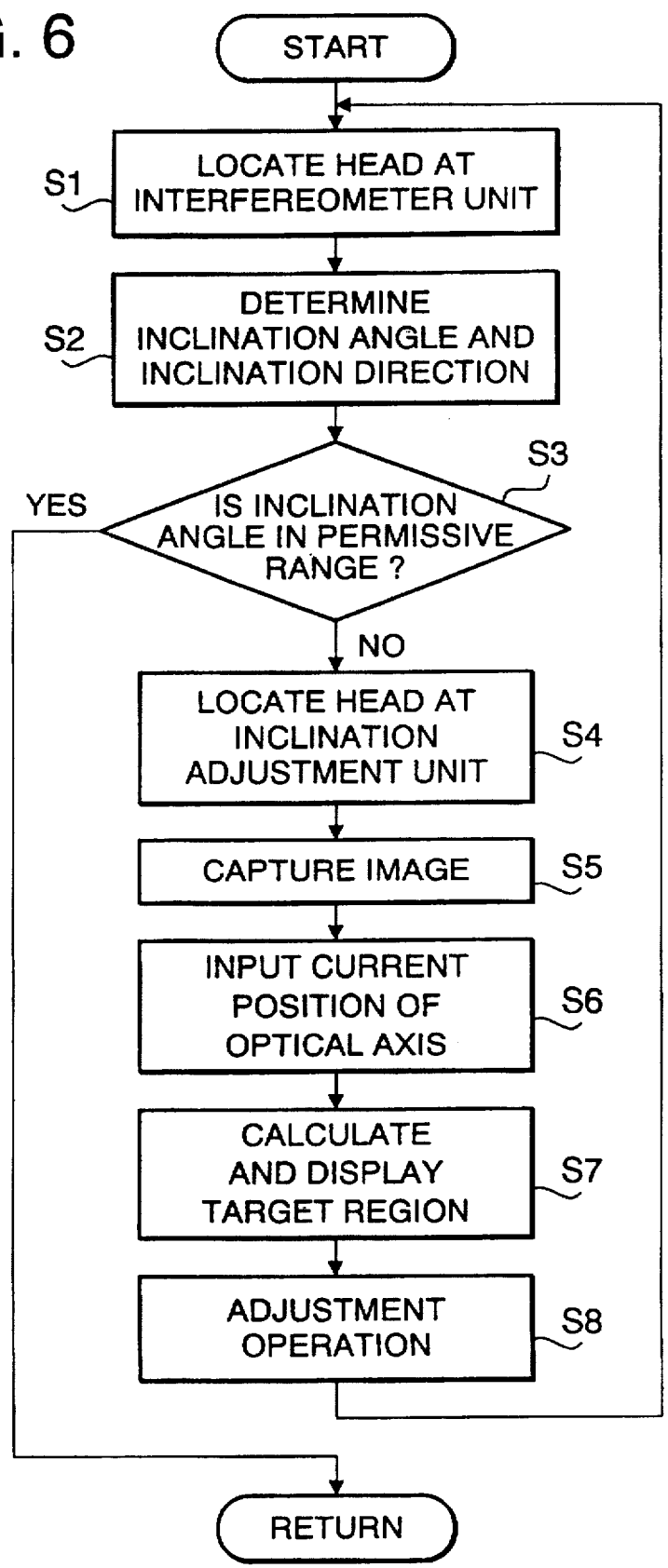

INCLINATION MONITORING SYSTEM

BACKGROUND OF THE INVENTION

The present invention relates to an inclination monitoring system, which is used, for example, in a lens inclination adjustment apparatus.

Conventionally, a data recording/reproducing device using an optical disk as a recording medium has been known. Such a device is provided with an optical system which includes a light source and an objective lens held in a lens holder. A recording medium (i.e., an optical disk) is set at a focal point of the objective lens. The light source emits a parallel light beam which is focused by the objective lens to form a beam spot on the recording medium. The beam reflects from the recording medium, and is received by an optical pick-up device.

In the data recording/reproducing device, an optical axis of the objective lens preferably intersects the recording medium at right angles. It is because, if the optical axis inclines with respect to a normal line to the recording medium, coma occurs, which may cause the beam spot formed on the recording medium to be wider than it should be. If the beam spot is wider, a density at which recording to the recording medium takes place will be lower. Further, if the beam spot is wider, a reproduced signal may include noise.

Recently, a numerical aperture NA of the optical system for such a device has become larger. In the device which has an optical system having relatively large numerical aperture NA, even a small inclination of the objective lens may affect the size of the beam spot greatly.

Accordingly, it is necessary to adjust the inclination of the object lens such that an inclination angle formed between the optical axis of the objective lens and a line normal to the recording medium is within a permissible range. The permissible range is, for example, a range within 3 minutes.

In order to adjust the inclination of the objective lens, conventionally, a lens inclination adjustment system is used. The conventional inclination adjustment system includes an interferometer unit and a lens inclination adjustment unit.

Firstly, at least a part of the data recording/reproducing device including the optical system and the light source is coupled with the interferometer unit, and interference fringes are observed. A user may determine the inclination angle and inclination direction which is a direction of inclination on a plane parallel to the surface of the recording medium or the cover glass facing the objective lens, based on the observed interference fringes.

Next, the data recording/reproducing device is coupled with the lens inclination adjustment unit, and the lens is moved so that the inclination (i.e., the inclination angle and inclination direction) is adjusted to be in a permissible range in accordance with the inclination angle and the inclination direction determined by the user.

When the lens is moved (i.e., when the inclination status of the lens is changed), it is necessary to monitor the change of the inclination, or current inclination status of the lens. An example of an inclination monitoring system employed in a inclination adjustment apparatus is shown in FIG. 9.

Generally, the objective lens 401 is formed to have a lens portion 402 and a planar flange portion 403 surrounding the lens portion. Monitoring of the inclination status of the lens 401 is performed by editing a beam to the flange portion 403 and detecting the reflected beam.

As shown in FIG. 9, the monitoring system includes an He-Ne laser source 404 and a screen 407. The He-Ne laser source 404 emits a narrow light beam which has a diameter of 1–2 mm towards the flange portion 403 of the lens 401 which is located about one meter away from the He-Ne laser source 404 through an opening 409 formed on the screen 407. The beam reflected by the flange portion 403 is incident on the screen 407. It should be noted that the flange portion 403 may be formed to be a mirror surface.

The reflected light beam is observed as an image on the screen 407, and a center of the image is regarded as a point where the optical axis of the reflected beam intersects the screen 407. The inclination status of the lens 401 is then monitored with reference to the position of the center of the image formed by the reflected beam on the screen 407.

However, since a surface of the flat portion 403 is microscopically uneven as the objective lens is made from a mold, the image of the reflected beam is not a perfect beam spot. As shown in FIG. 10, the image extends over 26 minutes arc in this example, and accordingly the center of the image of the reflected beam is difficult to be identified especially when the inclination status of the lens is being changed.

Therefore, even if the current inclination status is precisely determined with use of the interferometer, it may be difficult to adjust the inclination status since the inclination status cannot be monitored precisely.

SUMMARY OF THE INVENTION

It is therefore an object of the present invention to provide an improved inclination monitoring system with which the current inclination status, or change of inclination can be monitored accurately.

For the object, according to an aspect of the invention, there is provided, in combination, a lens having a lens portion and a flange portion surrounding the lens portion, and an inclination adjusting device, the flange portion comprising a planner surface which is formed to reflect light; the inclination adjusting device comprising: a light emitting unit which emits light to illuminate the lens, the light illuminating the entire area of the planner surface of the flange portion; a inclination status changing mechanism which is used to change the inclining status of the lens; an image receiving system having an image receiving surface; a converging lens which receives the light reflected on the flange portion and converges the light on the image receiving surface, wherein an image of the converged light moves on the image receiving surface simultaneously as the inclination status changing mechanism is actuated and the inclining status of the lens is changed.

With this arrangement, the inclination status of the lens can be monitored accurately.

Optionally, the light emitting unit emits a parallel light towards the lens.

Further optionally, the light emitting unit includes a light source emitting a diverging light, and a collimating lens which is arranged to receive the diverging light and emits a parallel beam which diameter is greater than a diameter of the flange portion of the lens. Alternatively the light emitting unit includes a light source and a magnifying optical system which magnifies a diameter of a beam emitted by the light source.

In particular, the light source may be a gas laser source emitting a parallel beam, and wherein the magnifying optical system includes a beam expander for converting the parallel beam to a diverging light, and a collimating lens which receives the diverging light and outputs a parallel light, a diameter of the parallel light being greater than a diameter of the flange portion.

Still optionally, a central portion, in cross section, of the beam reflected by the lens and incident to the converging lens is obscured. In this case, the image formed on the image receiving surface is made relatively small. This effect is known as a superresolution effect.

Furthermore, the image receiving system comprises a CCD (Charge Coupled Device), the image receiving surface is a surface of the CCD, the image receiving system outputting an image signal corresponding to an image received by the image receiving surface In this case, by transmitting the image signal to a displaying device, the image received by the CCD can be observed on the display.

According to another aspect of the invention, there is provided an inclination status monitoring system for monitoring an inclination status of a lens which inclination is to be changed, the lens having a lens portion and a flange portion surrounding the lens portion, the flange portion having a planar surface which is perpendicular to an optical axis of the lens portion, the lens being movably mounted on a lens holder, the inclination status monitoring system comprises: a light emitting unit which emits a parallel beam, the parallel beam being incident on the lens along the optical axis of the lens, a diameter of the parallel beam being greater than a diameter-of the flange portion; a converging lens; an image receiving system having an image receiving surface, light emitted from said light emitting unit being reflected by the flange portion and is incident on the image receiving surface through the converging lens, a reflected beam which is reflected by the flange portion being incident on the image receiving surface, wherein a position of an image of the reflected beam with respect to the image receiving surface changing simultaneously as the inclination of the lens is changed.

With this arrangement, the size of the image formed on the image receiving surface can be made relatively small, and accordingly, the position of the image can be identified precisely. Therefore, change of the inclination of the lens can be monitored easily.

Optionally, the image receiving system comprises an image receiving element which outputs an image signal corresponding to a received image, and a displaying device which receives the image signal and display an image corresponding to the received image signal.

According to further aspect of the invention, there is provided a method of monitoring an inclination status of a lens whose inclination status is changed, the lens having a lens portion and a flange portion surrounding the lens portion, the flange portion having a planar surface which is perpendicular to an optical axis of the lens portion, the lens being movably mounted on a lens holder, said planar surface being formed to reflect light, the method of monitoring inclination status monitoring system comprises: projecting a parallel beam on the lens along the optical axis of the lens, a diameter of the parallel beam being greater than a diameter of the flange portion, said parallel beam being reflected on at least the planar surface; receiving the reflected beam which is reflected on at least the planar surface with an image receiving element, the image receiving element outputting an image signal corresponding to a received beam; and displaying an image of said reflected beam in relation to a predetermined position in accordance with the image signal, the predetermined position being fixed with respect to the lens holder. With this method, a current inclination status of the lens can be monitored. Accordingly, if the lens inclination is changed, the changed direction and amount can be observed.

Optionally, the step of receiving the reflected beam comprises a step of converging the reflected beam with use of a converging lens to converge the beam directed from at least the planar surface to the image receiving element. With use of the converging lens, the size of the image received by the image receiving element is made smaller, which makes it easy to identify a central portion of the reflected beam.

DESCRIPTION OF THE ACCOMPANYING DRAWINGS

FIG. 6 is a flowchart illustrating a process of adjustment of the inclination of the objective lens;

DESCRIPTION OF THE PREFERRED EMBODIMENT

A lens inclination adjustment system according to an embodiment of the invention is described.

Figure 1:
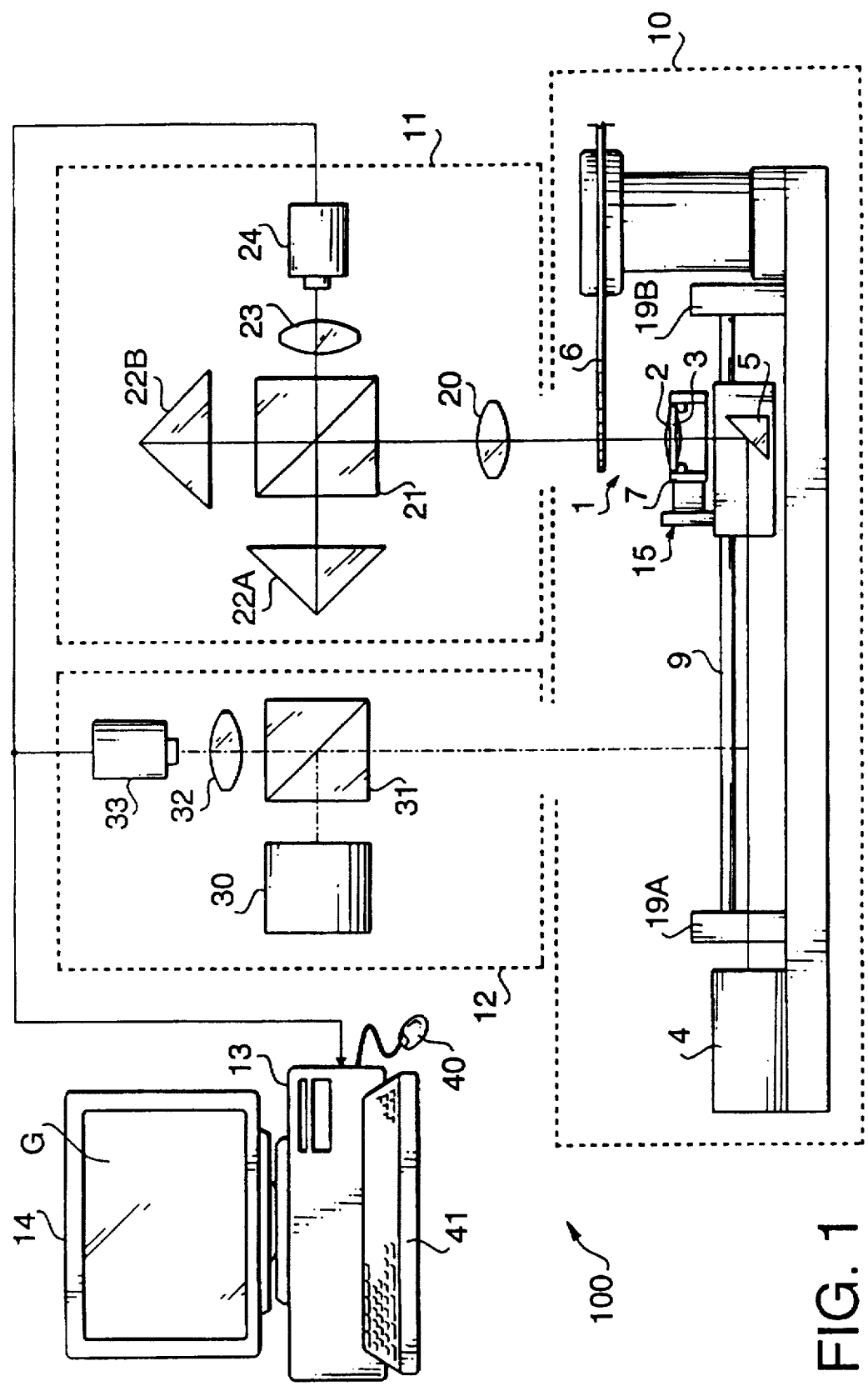
FIG. 1 is a diagram showing an arrangement of a lens adjusting system.

FIG. 1 is a diagram illustrating a schematic structure of an inclination adjustment system 100. The lens inclination adjustment system 100 includes a data recording/reproducing device 10 which uses an optical disk, an interferometer unit 11 to be coupled with the data recording/reproducing device 10, an inclination adjusting unit 12 which is also coupled to the data recording/reproducing device 10 and used for changing the inclination of an objective lens of the data recording/reproducing device 10, and a data processing device 13 such as a personal computer or the like. The data processing device 13 includes a display 14, a keyboard 41 and a mouse 40.

The data recording/reproducing device 10 is provided with an optical system which includes a light source 4, a pair of rail members 9 ends of which are supported by a pair of rail supports 19A and 19B. Further, an optical head 15 is slidably supported by the pair of rail members 9. The optical head 15 is movable within a movable range, which is a range between the pair of rail supports 19A and 19B, along the rail 9, and includes an objective lens 1, a lens holder 7 on which the objective lens 1 is mounted, and a mirror 5.

When the inclination of the objective lens 1, with respect to the recording medium is determined, as described below, a cover glass 6 is placed in a position in which a recording medium (e.g., an optical disk) would normally be placed in the data recording/reproducing device 10.

Figure 4A:
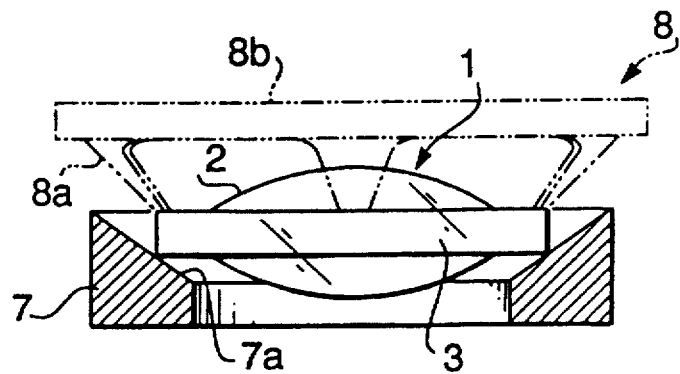
FIG. 4a is a side view of a objective lens, a lens holder and a jig used for adjusting the inclination of the lens.

As shown in FIG. 4a, the objective lens 1 includes a central lens portion 2, and a flat portion 3 which encircles a circumference of the lens portion 2. An outer edge of the flat portion 3 is supported on a sloping surface 7a of the lens holder 7. After the inclination of the objective lens is adjusted, the objective lens is fixedly secured on the sloping surface with adhesive agent. In this embodiment, a UV (ultraviolet) hardening adhesive agent is utilized. The UV hardening adhesive agent initially has a certain viscosity, and when illuminated with a UV light, it hardens. In practice, firstly the lens is placed on the sloping surface 7a with the UV hardening adhesive agent applied, and the inclination is adjusted. After the inclination is adjusted, the UV light is projected to the lens holder 7 so that the UV hardening adhesive agent is hardened and the object lens is fixedly secured.

Referring again to FIG. 1, the interferometer unit 11 includes a collimating lens 20, a beam splitter 21, corner-cube reflectors 22A and 22B, an imaging lens 23, and a CCD (charge coupled device) 24. The interferometer unit 11 is used for observing interference fringes of an incident light beam. The inclination direction and the inclination angle θ are determined based on the observed interference fringes.

The inclination adjusting unit 12 is used to adjust the inclination of the objective lens, and includes a light emitting device 30, a beam splitter 31, a collimating lens 32, a CCD (charge coupled device) 33, and an adjusting device (described later).

The data processing device 13 is connected with the CCD's 24 and 33. Image signals are transmitted from the CCD's 24 and 33 to the data processing device 13, and then displayed on a screen G of the display 14.

Adjustment of the inclination of the objective lens 2 with use of the lens inclination adjustment system 100 is now described.

Figure 2:
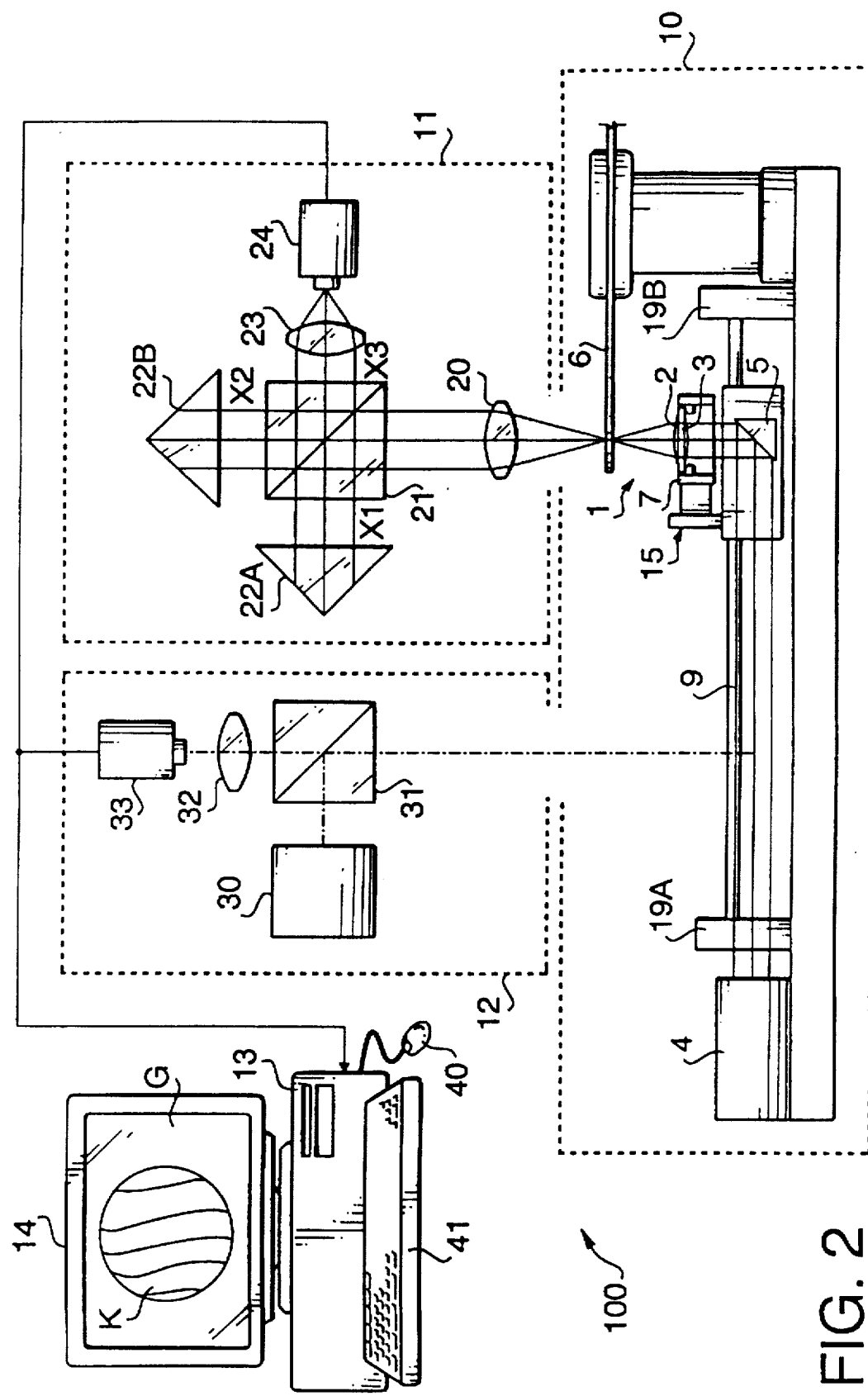
FIG. 2 is a diagram of a lens adjusting system wherein an interference fringes is observed.

The interferometer 11 is coupled to the data recording/reproducing device 10 with use of a coupling structure (not shown). Then, the optical head 15 is first located at a position where the object lens 1 faces the interferometer unit 11, as shown in FIG. 2. In accordance with the interference fringes formed by the interferometer unit 11, the inclination angle θ between the axis of the beam incident on the cover glass 6 and the line normal to the cover glass 6, and the inclination direction are determined.

Figure 3:
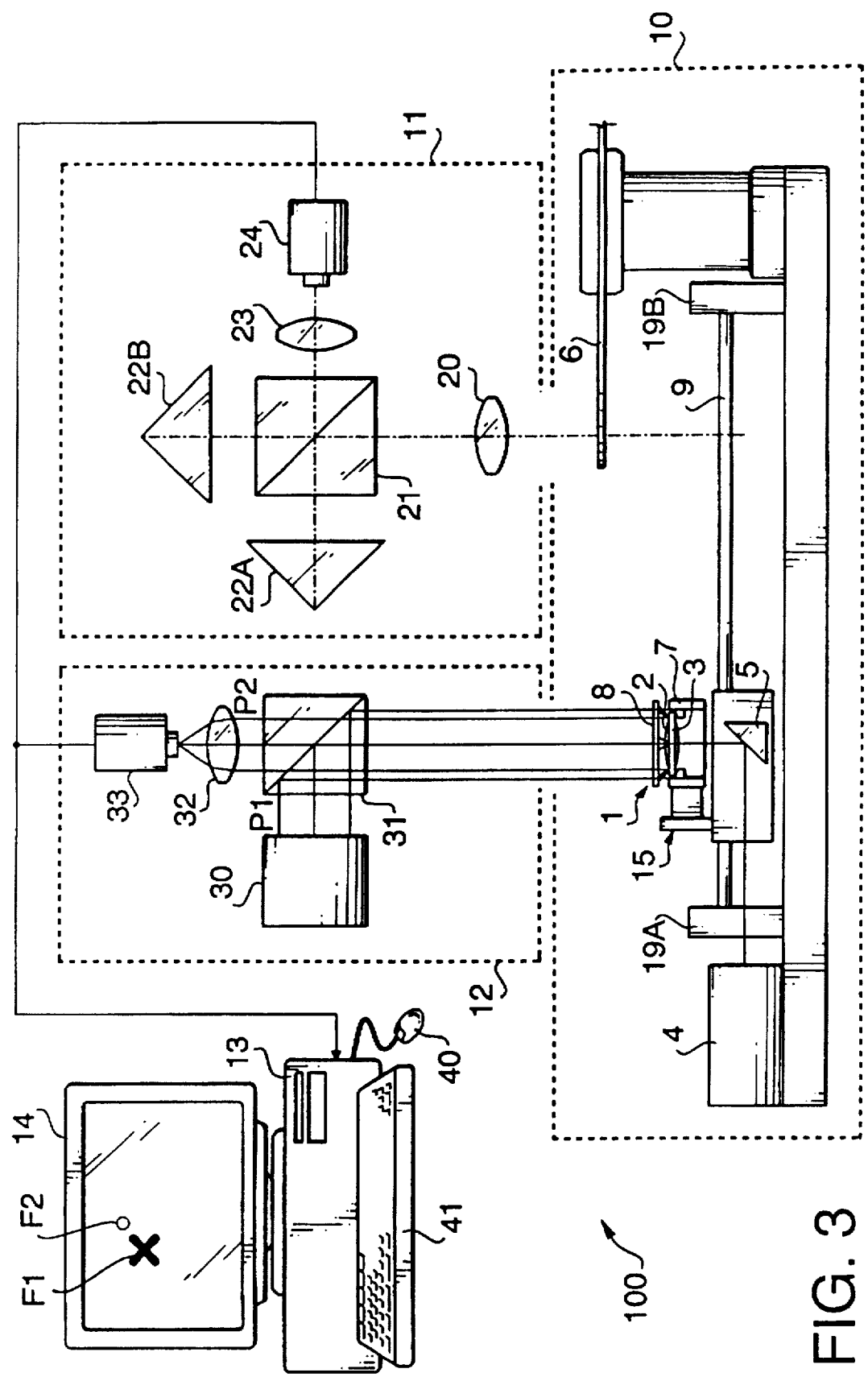
FIG. 3 is a diagram of a lens adjusting system wherein an inclination of an objective lens is adjusted.

If the inclination angle θ is greater than a predetermined threshold value (e.g., 3 minutes), the optical head 15 is then moved to the other side of its movable range so that the object lens 1 faces the inclination adjusting unit 12, as shown in FIG. 3. The inclination of the objective lens 1 is then adjusted, based on the inclination angle θ and the inclination direction with use of the adjusting device. This process is repeated until the inclination angle θ is below the predetermined threshold value. When the inclination of the objective lens is finished, the objective lens is secured in place using an adhesive or the like.

A detailed process for determining the inclination angle θ and adjusting the inclination of the optical axis of the objective lens 1 is now described with reference to FIG. 6.

The objective lens 1 is mounted on the lens holder 7 with the UV hardening adhesive is applied on the sloping surface 7a. Then, in step S1, the optical head 15 is located to face the interferometer unit 11, as shown in FIG. 2. A light beam emitted from the light source 4, is reflected on the mirror 5, and is focused by the objective lens 1 onto the cover glass 6. The focused light beam passes through the cover glass 6 and is collimated by the collimating lens 20 to be a parallel beam X.

In particular, the cover glass 6 is set in place of the recording medium, such as an optical disk or the like, to emulate a transparent layer of an optical disk. That is, since the optical disk has a transparent layer covering a surface where the focused beam reflects, and in operation the focused beam passes through the transparent layer, before reflecting on the data layer and passing back through the transparent layer the cover glass 6 is arranged to simulate the transparent layer of the optical disk.

The parallel beam X is divided by the beam splitter 21 into divided parallel beams X1 and X2. The divided parallel beams X1 and X2 reflect on the corner-cube reflectors 22A and 22B back to the beam splitter 21. The divided parallel beam X1 reflected by the corner-cube reflector 22A passes through the beam splitter 21 and directed to the lens 23. The divided parallel beam X2 passed through the beam splitter 21 is reflected by the corner-cube reflector 22B and then reflected by the beam splitter 21 towards the lens 23. The divided parallel beams X1 and X2 are converged by the converging lens 23 so that the interference fringes K are formed on the CCD 24. The CCD 24 outputs an image signal to the data processing device 13 and an image of the interference fringes K is displayed on the screen G of the display 14.

In this case, positions of the collimating lens 20, the beam splitter 21, and the corner-cube reflectors 22A and 22B are adjusted in relation to the cover glass 6. Accordingly, if the optical axis of the objective lens 1 is perpendicular to the cover glass 6, the interference fringes K are not distorted.

In step S2, the data processing device 13 calculates the inclination angle θ and inclination direction. Specifically, the data processing device 13 compares the signal output from the interferometer unit 11 (the CCD 24) with a reference signal pre-stored in a memory (not shown) of the data processing device 13, and calculates the inclination direction and the inclination angle θ based on the comparison result. The calculated inclination direction and the inclination angle θ are stored in the memory of the data processing device 13, and will be used for generating a vector data representing the inclination direction and the inclination angle θ of the objective lens 1.

In step S3, the data processing device 13 then compares the inclination angle θ with the predetermined threshold value (e.g., 3 minutes) to determine whether the inclination angle θ is within a permissible angle range at step S3. If the inclination angle θ is out of the permissible range (NO at step S3), the inclination of the objective lens 1 is adjusted in the following steps S4–S8.

Firstly, the light source 4 is turned OFF, and the optical head 15 is moved to the position at which the optical head 15 faces the inclination adjusting unit 12 at step S4, as shown in FIG. 6. In this case, shock applied to the objective lens 1 is relatively small, and accordingly the objective lens 1 may not change its inclination on the lens holder 7.

Figure 4B:
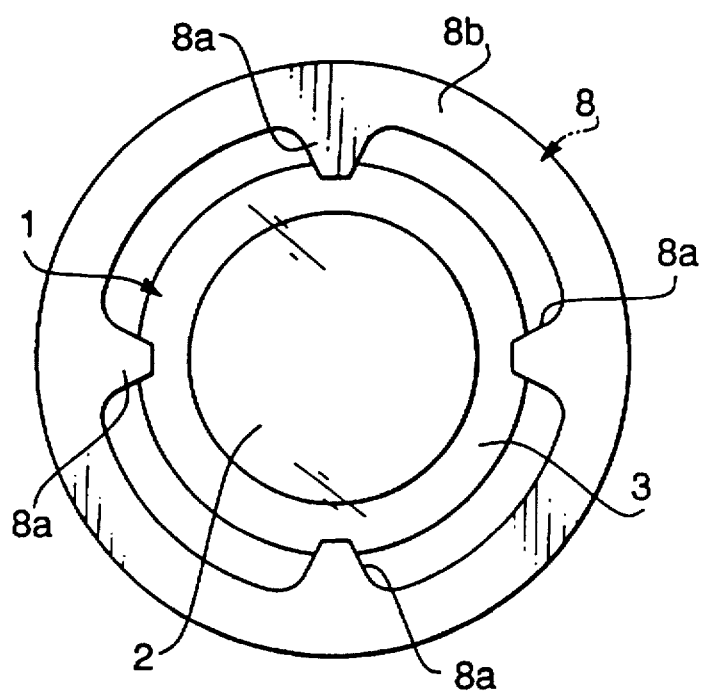
FIG. 4b is a top view of the lens and the jig.

When the inclination is to be changed, as shown in FIGS. 4a and 4b, a jig 8 is placed on the objective lens 1. The jig 8 includes a pick 8a and a mirror surface 8b. The pick 8a abuts the flat portion 3 of the objective lens 1 and the inclination of the objective lens 1 is adjusted by known operation of the jig 8. A mechanism for adjusting the inclination of the objective lens 1 is disclosed in U.S. Pat. No. 5,553,052, teachings of which are incorporated herein by reference.

FIG. 3 shows a condition in which the optical head 15 is positioned to face the inclination adjusting unit 12. It should be noted that as the inclination of the objective lens 1 is adjusted, the inclination status of the objective lens 1 is monitored. For this purpose, the inclination adjusting unit 12 is provided with an inclination status monitoring system, which includes the light emitting unit 30, the beam splitter 31, the converging lens 32, the CCD 33, the data processing device 13 and the display 14.

At step S5, the light emitting device 30 is driven to emit a light beam P1 which has a slightly larger diameter in cross section than a diameter of the objective lens 1. The light beam P1 reflects on the beam splitter 31 toward the objective lens 1. The flat portion 3 of the objective lens 1 and the mirror surface 8b of the jig 8 reflect a part of the beam P1. A reflected beam P2 (i.e., the beam reflected by the flat portion 3 of the objective lens 1 and the mirror surface 8b of the jig 8) passes through the beam splitter 31, is focused by the converging lens 32 on the CCD 33, which outputs an image signal to the data processing device 13. Thus, an image of the reflected beam P2 focused on the CCD 33 is displayed on the screen G of the display 14.

Figure 5A:
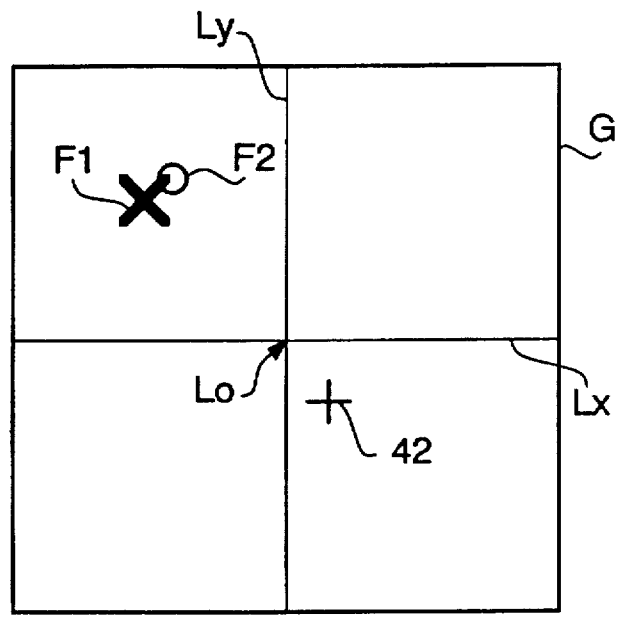
FIG. 5a shows a screen image of a reflected beam.

FIG. 5a shows the image displayed on the screen G of the monitor 14, corresponding to the reflected beam P2.

A first figure F1 represents an image corresponding to the flat portion 3 of the objective lens 1; and a second figure F2 represents an image corresponding to the mirror surface 8a. A center of the first figure F1 corresponds to the optical axis of the objective lens 1. The second figure F2 is to be ignored since the second figure F2 does not correspond to the optical axis of the objective lens 1.

As described above, the diameter of the beam P1 is relatively great with respect to the diameter of the objective lens 1 so that a beam reflected by the entire area of the flat portion 3 of the objective lens 1 is incident to the lens 32.

It is known that the radius of the beam waist ωo is expressed as follows:

ωo=λf/πω where, λ is a wavelength of the beam, f is the focal length of the lens (in this case, the lens 32), and ω is the radius of the beam incident to the lens. As understood from the formula above, if the radius ω of the incident beam is greater, the diameter of the beam waist ωo is smaller. It is further known that, if the central area, in cross section, of the incident beam is obscured, the beam waist becomes smaller.

In the present embodiment, since the beam P1 is projected to the entire surface of the flat portion 3 of the objective lens 1, the beam reflected on the flat portion 3 and incident to the lens 32 has relatively a great diameter. Further, since the beam incident to the lens 32 is the beam reflected by the flat portion 3 of the objective lens 1, the central portion thereof is obscured. In such a case, i.e., the cross section of the beam has an annular shape, the beam converged by the lens 32 has a smaller size than in a case where the beam has a circular cross section. This effect is known as a superresolution effect. Accordingly, the size of the spot formed on the CCD 33, i.e., the figure F1 is relatively small. Because of the same reason, the size of the figure F2 is also small. It should be noted that the beam projected and reflected on the lens portion 2 diverges due to the concave shape of the lens portion 2 and does not substantially affect the image formed on the CCD 33. Further, since the beam reflected on the flat portion 3 at the portions between the picks 8a and directed to the edges of the portions of the jig 8 diverge in directions parallel to diameters connecting the opposite portions between the picks 8a, the figure F1 is formed to be X-shaped.

Further to the above, the first figure F1 as shown in FIG. 5a still extends across about 10 minutes of arc. However, since a part of the parallel beam P1 is shaded by the pick 8a and diffracted, a center region of the first figure F1 is brighter within a range of about 2 minutes of arc. Accordingly, it is relatively easy to identify the center of the first figure F1.

Lines Lx and Ly displayed on the screen G represent axes of the inclination adjusting unit 12, and Lo is an origin of Lx-Ly coordinates. In this embodiment, the cursor pointer 42 is shown as a small cross.

Figure 5B:
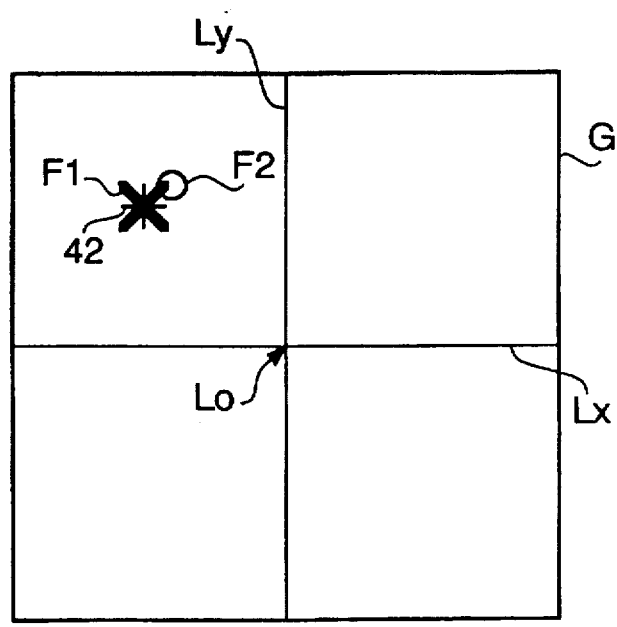
FIG. 5b shows a screen image of when the current inclination of the lens is input.

At step S6, the operator is required to locate the cursor pointer 42 on the center of the first figure F1, and to click a mouse button (not shown) to input the position of the first figure F1 on the screen G (see FIG. 5b). Since the center of the first figure F1 represents the optical axis of the objective lens 1, the data processing device, 13 calculates a target position based on the position of the first figure F1 on the screen G and the data representing the inclination direction and inclination angle which were obtained at S2 with use of the interferometer unit 11. Preferably the cursor pointer 42 is moved with use of the mouse 40, and the position is input by clicking the mouse button (not shown). Alternatively, the keyboard 41 or some other input device may also be used, if available.

Figure 5C:
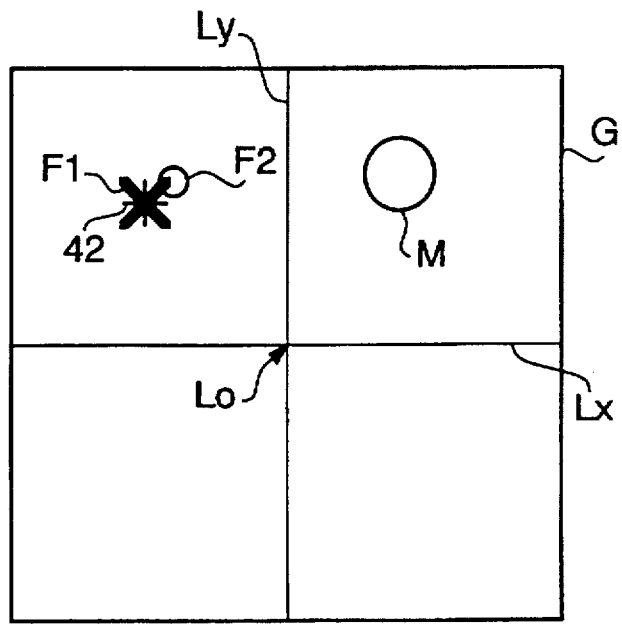
FIG. 5c shows a screen image of a target region which is referred to for adjusting the inclination of the lens.
Figure 5D:
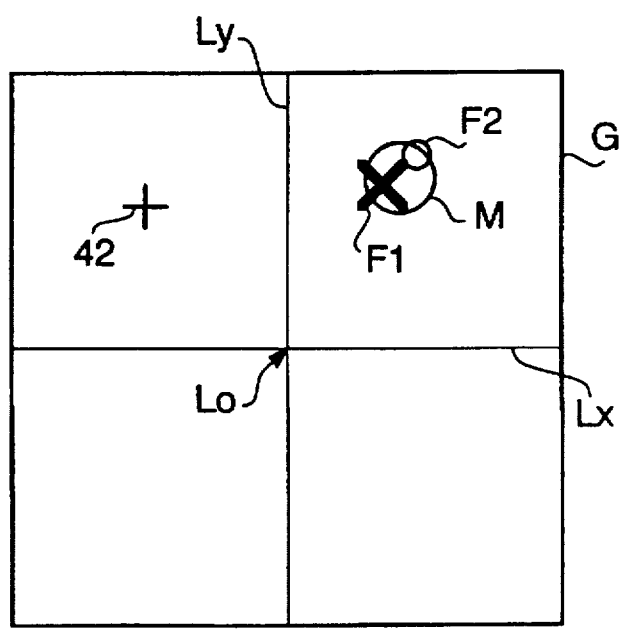
FIG. 5d shows a screen image when the lens position has been adjusted.

In Step S7, the data processing device 13 calculates the position of the target region M based on the inclination direction, inclination angle θ. Specifically, the data processing device 13 calculates the position of the target region M on the screen G, based on the vector data stored in the memory at step S2, and the position of the center of the first figure F1 input in S6, and displays the target region M on the screen G as shown in FIG. 5c. As described briefly above, the target region M corresponds to the permissible range of the inclination angle θ, that is, the area in which the inclination angle θ is less than the predetermined threshold value (e.g., 3 minutes). Thus, if the center of the first figure F1 is moved into the target region M as shown in FIG. 5d by changing the inclination of the objective lens 1, the inclination angle θ will be such that the data recording/reproducing device 10 can correctly record and/or reproduce data.

In step S8, the operator manipulates the inclination adjusting unit 12 to adjust the inclination of the optical axis such that the first figure F1 is moved into the target region M on the screen G of the display 14. Note that the jig 8 may slips on the objective lens 1, and the objective lens 1 may not move even if the jig 8 is moved to change the inclination of the objective lens 1. In order for the operator to ensure that the jig 8 and the objective lens 1 are both moved, it is preferable to monitor the movement of the jig 8. In the embodiment, the second figure F2 represents the inclination of the jig 8, and accordingly, the operator can adjust the inclination of the objective lens 1 with monitoring the inclining status of both the objective lens 1 and the jig 8.

After step S8, the light source is turned OFF, the jig 8 is detached from the objective lens 1, and the optical head 15 is located at the position where it faces the interferometer unit 11 again (S1).

Thereafter, similar to the above, the interference fringes K are captured again as in step S2, and it is determined whether the inclination angle θ is out of the predetermined permissible range by comparing the data of the captured interference fringes with the pre-stored data (S2).

If the inclination angle θ is within the permissive range (i.e., within 3 minutes) (YES at S3), the adjustment of the optical axis is finished. Then, the optical head 15, especially, the portion where the objective lens 1 is supported on the sloping portion 7a is illuminated by the UV light. Thus the UV hardening adhesive is hardened, and accordingly, the objective lens 1 is fixed in the lens holder 7.

In the above mentioned description, a precise adjustment of the optical axis of the objective lens 1 is expected.

Figure 7:
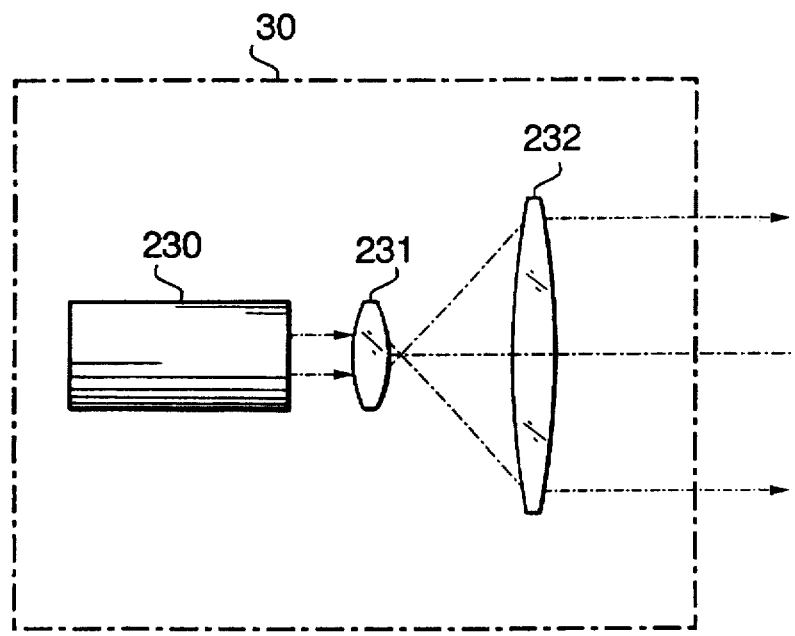
FIG. 7 shows an example of a light emitting unit according to a first embodiment of the invention.

An exemplary structure of the light emitting device 30 is shown in FIG. 7.

As shown in FIG. 7, the light emitting device 30 includes a light source 230 which emits a narrow parallel light beam PO, and two lenses 231 and 232.

In this example, the lens 231 has a shorter focal length than the lens 232. Note that the lenses 231 and 232 area arranged such that the focal points thereof coincide with each other. The lenses 231 and 232 constitute a relay lens optical system. Image magnification "m" of the relay lens optical system, i.e., the lenses 231 and 232 is greater than one. The narrow parallel beam PO is incident in the lens 231 and is converged by the lens 231 to focus on the focal point FO. The point FO is also the focal point of the lens 232, the beam is incident on the lens 232 and the expanded parallel beam P1 is emitted from the lens 232.

Figure 8:
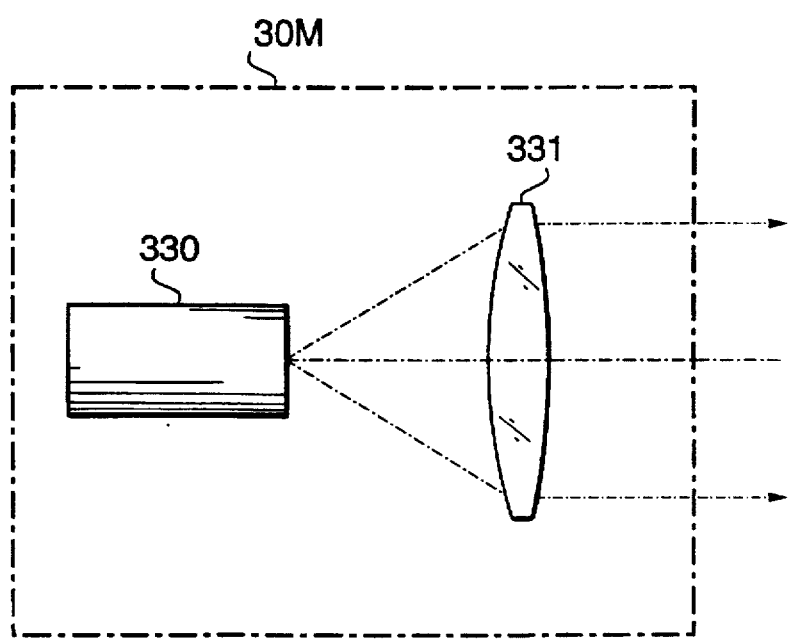
FIG. 8 shows an alternative arrangement of the light emitting unit according to a second embodiment of the invention;.
Figure 9:
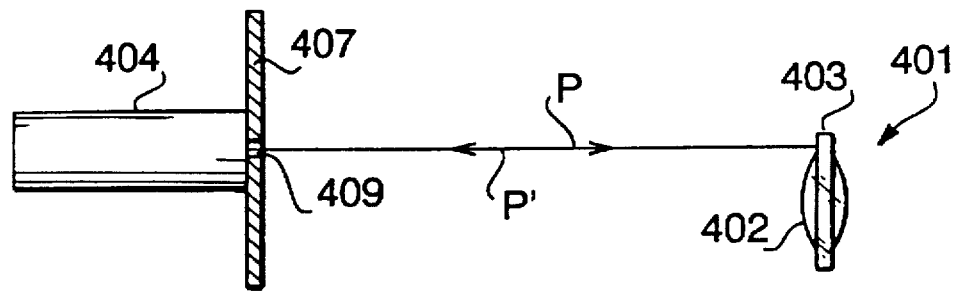
FIG. 9 is a schematic side view of a conventional inclination monitoring system of a lens inclination adjusting apparatus.
Figure 10:
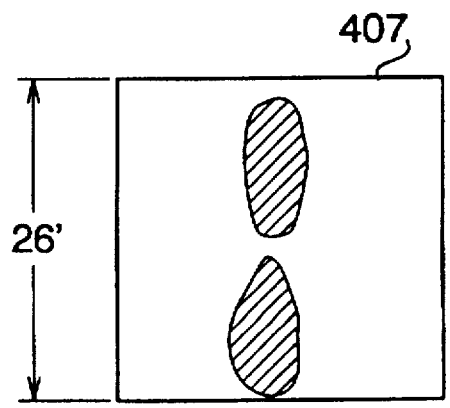
FIG. 10 is an example of an image formed on a screen in the conventional inclination monitoring system shown in FIG.9.

Another example of the light emitting device is shown in FIG. 8. A light emitting device 30M includes a light source 330 which emits a diverging light, and a collimating lens 331. The light emitted by the light source 330 is incident on the lens 331, and a parallel beam is emitted from the collimating lens 331.

It should be noted that only two examples of the light sources are described above, various kinds of light source is applicable as far as the beam is incident over the entire area of the flat portion of the objective lens 1.

As described above, while the inclination of the objective lens 1 is changed, the status of the objective lens 1 can be monitored precisely, and inclination can be adjusted easily and accurately.

Although the structure and operation of a lens adjusting system is described herein with respect to the preferred embodiments, many modifications and changes can be made without departing from the spirit and scope of the invention.

The present disclosure relates to subject matter contained in Japanese Patent Application No. HEI 08-197314, filed on Jul. 26, 1996, which is expressly incorporated herein by reference in its entirety.

What is claimed is:

1. A lens having a lens portion, a flange portion surrounding said lens portion, and an inclination monitoring device,
said flange portion comprising a planar surface formed to reflect light;
said inclination monitoring device comprising:
a light emitting unit that emits light to illuminate said lens, said light illuminating an entire area of said planar surface of said flange portion;
an image receiving system having an image receiving surface; and
a converging lens that receives light reflected on said flange portion and converges said light on said image receiving surface.

2. The lens of claim 1, further comprising an inclination status changing mechanism that changes an inclining status of said lens;
wherein an image of said converged light moves on said image receiving surface simultaneously as said inclination status changing mechanism is actuated, said inclining status of said lens being changed by said inclination status changing mechanism.

3. The lens of claim 1, wherein said light emitting unit emits a parallel light towards said lens.

4. The lens of claim 1, wherein said light emitting unit comprises a light source that emits diverging light, and a collimating lens that receives said diverging light and emits a parallel beam with a diameter greater than a diameter of said flange portion of said lens.

5. The lens of claim 1, wherein said light emitting unit comprises a light source and a magnifying optical system that magnifies a diameter of a beam emitted by said light source.

6. The lens of claim 5, wherein said light source comprises a gas laser source emitting a parallel beam, and wherein said magnifying optical system comprises a beam expander that converts said parallel beam to a diverging light, and a collimating lens that receives said diverging light and outputs a parallel light, a diameter of said parallel light being greater than a diameter of said flange portion.

7. The lens of claim 1, wherein a central portion, in cross section, of said beam reflected by said lens and incident to said converging lens is obscured.

8. The lens of claim 1, wherein said image receiving system comprises a CCD (Charge Coupled Device), said image receiving surface being a surface of said CCD, said image receiving system outputting an image signal corresponding to an image received by said image receiving surface.

9. An inclination status monitoring system for monitoring an inclination status of a lens, in which an inclination is to be changed, said lens having a lens portion and a flange portion surrounding said lens portion, said flange portion having a planar surface perpendicular to an optical axis of said lens portion, said lens being movably mounted on a lens holder, said inclination status monitoring system comprising:
a light emitting unit that emits a parallel beam, said parallel beam being incident on said lens along said optical axis of said lens, a diameter of said parallel beam being greater than a diameter of said flange portion;
a converging lens;
an image receiving system having an image receiving surface, light emitted from said light emitting unit being reflected by said flange portion and being incident on said image receiving surface through said converging lens, a reflected beam reflected by said flange portion being incident on said image receiving surface,
wherein a position of an image of said reflected beam with respect to said image receiving surface changes simultaneously as said inclination of said lens is changed.

10. The inclination status monitoring system according to claim 9, wherein said image receiving system comprises an image receiving element which outputs an image signal corresponding to a received image, and a displaying device which receives said image signal and display an image corresponding to said received image signal.

11. A method for monitoring an inclination status of a lens whose inclination status is changed, the lens having a lens portion and a flange portion surrounding the lens portion, the flange portion having a planar surface perpendicular to an optical axis of the lens portion, the lens being movably mounted on a lens holder, the planar surface being formed to reflect light, the method of monitoring inclination status monitoring system comprising:

projecting a parallel beam on the lens along the optical axis of the lens, a diameter of the parallel beam being greater than a diameter of the flange portion, the parallel beam being reflected on at least the planar surface;

receiving the reflected beam reflected on at least the planar surface with an image receiving element, the image receiving element outputting an image signal corresponding to a received beam; and displaying an image of the reflected beam in relation to a predetermined position in accordance with the image signal, the predetermined position being fixed with respect to the lens holder.

12. The method of claim 11, wherein the receiving of the reflected beam comprises converging the reflected beam with use of a converging lens to converge the beam directed from at least the planar surface to the image receiving element.

* * * * *